Sept. 7, 1954   W. J. KNOCHEL ET AL   2,688,709
X-RAY ANODE AND METHOD OF MAKING
SAME BY ELECTRIC WELDING
Filed Nov. 12, 1949
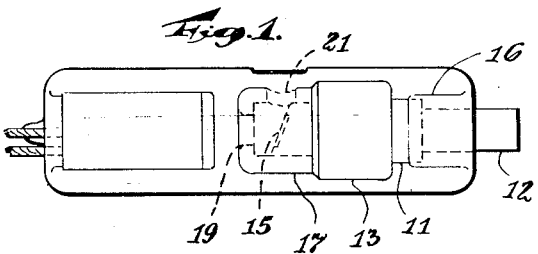
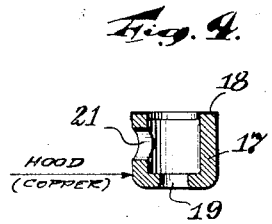
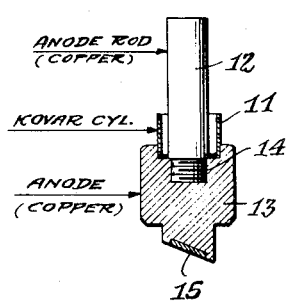
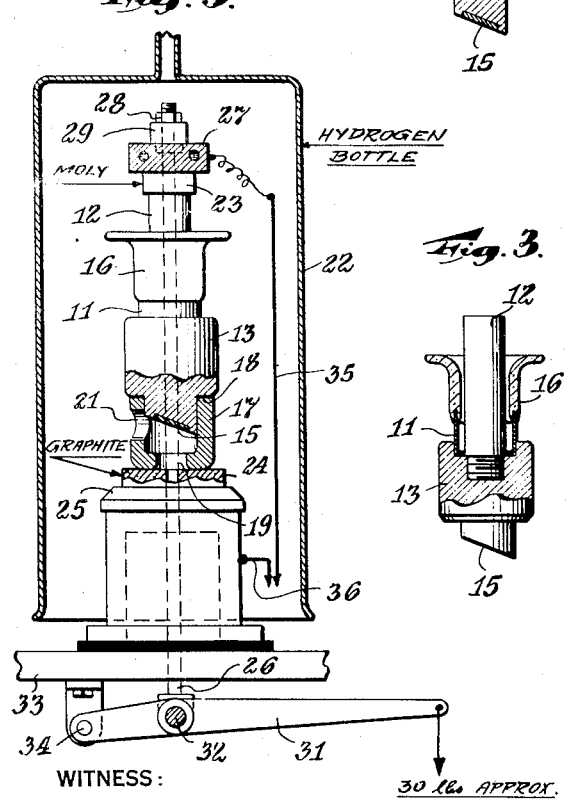
INVENTORS
W. J. KNOCHEL
W. WEINGARTNER.
BY
ATTORNEY Patented Sept. 7, 1954

2,688,709

UNITED STATES PATENT OFFICE 2,688,709

X-RAY ANODE AND METHOD OF MAKING SAME BY ELECTRIC WELDING

William J. Knochel, East Orange, and William Weingartner, Irvington, N. J., assignors to Westinghouse Electric Corporation, East Pittsburgh, Pa., a corporation of Pennsylvania Application November 12, 1949, Serial No. 126,716

3 Claims. (Cl. 313—59)

1

This invention relates to uniting metal parts and, in particular, to the uniting of the copper hood for a small X-ray tube to the anode block thereof.

The principal object of our invention, generally considered, is to unite metal parts generally, and the hood of an X-ray tube to the anode block specifically, in an improved manner to thereby avoid certain undesirable results which have occurred in the past.

Another object of our invention is to unite metal parts by butt welding after forming the engaging surfaces so that no solder or additive brazing material is needed, a reducing or hydrogen atmosphere being used to prevent oxidation during such operation.

A further object of our invention is to form small X-ray tubes by assembling the parts in a conventional manner, with the exception of the hood which fits over the target portion of the anode block, said hood being electropolished and used with or without gold plating or grit blasting the open end portion, and then fitting said hood over the target portion of the anode block and directly butt welding it to said block while under pressure and in a preferably hydrogen atmosphere, after which the assembly may be sealed to the cathode-bulb assembly in a conventional manner.

A still further object of our invention is to make it practical to weld the hood to the glassed anode assembly.

Other objects and advantages of the invention will become apparent as the description proceeds.

Referring to the drawings:

Fig. 1 is an elevational view of a small dental X-ray tube, which may be manufactured in accordance with our invention;

Fig. 2 is an elevational view, partly in axial section, showing a sub-assembly of the tube involving the anode, rod, and "Kovar" cylinder;

Fig. 3 is a view corresponding to Fig. 2, but showing the sub-assembly after it has been united to the glass flare;

Fig. 4 is an axial sectional view of the copper hood which is to be united to the assembly of Fig. 3;

Fig. 5 is an elevational view, partly in vertical section, showing apparatus for practicing our invention, and assembled parts of the tube in place, ready for a welding operation;

Fig. 6 is a flow diagram indicating the steps of a preferred method.

Prior to our invention, anodes for small dental X-ray tubes were required to be gold brazed to

2 the hood and the "Kovar" ring. This was followed by radio frequency glassing of the flare to the anode assembly. During this glassing and subsequent annealing, the anode would oxidize, presenting a difficult problem. Due to the construction of such an anode assembly, acid treating solution may be trapped in voids between the anode and the hood, when an attempt is made to chemically clean such an assembly. Besides this, the solder fillet granulates allowing foreign material to remain in depressions during the mechanical polishing operation. It was attempted to eliminate the chemical cleaning and substitute a hydrogen annealing operation, but this was not too successful. A mechanical polish with "Aloxite" cloth on the outside of the anode helped slightly.

The above method of making such anode assembly resulted in many failures, because of excessive bulb deposit when the tubes were put into service.

The following procedure has been adapted to overcome the troubles before enumerated and improve the quality of such small hooded dental anode tubes and, in accordance therewith, tubes without any bulb deposits have been manufactured. The new procedure of assembling the hood with the anodes for such tubes is as follows, and enables us to weld the hood to the glass anode assembly in a manner which would not otherwise be practical:

1. With reference to the drawing, and particularly Figs. 2, 3 and 4, a hollow "Kovar" cylinder 11 and anode rod 12 are gold brazed to the anode block 13, in accordance with conventional practice. In the embodiment contemplated, the anode rod is formed of copper and may be threadedly connected with the copper anode or anode block 13, as indicated at 14. The target portion 15, which may be faced by conventional material such as tungsten, projects from said copper block in a direction opposite that of the rod 12.

2. The anode assembly, illustrated in Fig. 2, is then connected to the glass flare 16, preferably using radio frequency methods, and lehr annealed in a covered container in an atmosphere of "forming" gas, in accordance with conventional practice.

3. The anode 13 is then desirably cleaned by acid and electropolished, in accordance with standard methods, for two or three minutes.

4. The hood 17, illustrated in Fig. 4 and desirably formed of copper, is then acid-cleaned and electropolished for two minutes, in accordance with standard methods. After this polishing, it may be used without further processing, or have the flat outer surface of its open end portion gold plated for two minutes, as indicated at 18, to ⅛" from the edge, or have the edge portion grit blasted.

5. The next step, in accordance with our invention, is to join the flat outer surface of the copper hood to the flat annular surface of the copper anode around the projection carrying the target portion 15, so that said hood encloses said target portion, with the exception of the axial opening 19 and the radial opening 21 in the hood. This is accomplished by passing current through the parts to be joined and applying pressure while said parts are held in a bottle 22 through which hydrogen, or other reducing atmosphere, flows.

We have found that during such process more consistent results are obtained when a molybdenum, or other high-melting point metal button 23 is placed between the upper end of the anode rod 12 and one side of the electrical and mechanical system, while a graphite plug 24 is placed between the hood 17 and the other side of the mechanical and electrical system, that is, as a supporting block resting on a bench or other water-cooled support or lower electrode 25. In this manner the hood is heated to a higher temperature than the rest of the assembly, since the graphite is a poorer conductor than the molybdenum, while the anode rod 12 is kept comparatively cold, thereby preventing the gold solder joint from attaining a temperature at which recrystallization may occur, or at which leaks through said joint may develop.

The desired pressure may be applied by having connecting rods 26, one of which is illustrated in Fig. 5, pass up through the bench, the supported assembly, and the upper water cooled electrode 27, being held from slipping therethrough by nuts 28 and washers 29. The desired force may be applied to these rods by pivotally connecting them to a lever 31 therebetween, as indicated at 32, and pivoting said lever to the platform or other means 33 which supports the bench 25, as indicated at 34, a weight, which in the present instance is desirably about 30 pounds, being applied to the free end portion of the lever 31.

The welding current is introduced to the assembly through leads 35 and 36, respectively connecting with the upper electrode 27 and the supporting bench 25. We have found that it is desirable to use an electric welding current of from 425 to 475 amperes, when the current is alternating, and when the more than 30 pounds pressure is applied as indicated. A preferred ratio between that part of the lever 31 to the right of the connection 32, and that part to the left thereof, is 11¼" to 4", so that about 114 pounds pressure is applied in accordance with the example given. This welding current is of sufficient strength to butt weld the parts together when continued for about 1½ minutes, while desirably between 75 and 100 cu. ft. per hour of hydrogen flows through the bottle. In this way a satisfactory welded joint can be obtained, either between a copper surface, a gold plated copper surface, or a grit-blasted copper surface and an engaged copper surface.

From microphotographs it has been found that, when one surface is gold plated, a complete flow of gold takes place between the copper surfaces. If no gold plating is used, complete interlocking grain growth results. Thus a strong bond is effected in either case, between the edge portion of the hood and the block around the base of the target portion.

During the welding operation it has been observed that the graphite member 24 took one minute, under the conditions specified, to assume a temperature of from 1000° to 1030° C., while the hood 17 reached a temperature of from 925° to 975° C. At the same time, the temperature of the anode body was only about 900° C. at the end of 1½ minutes. In normal operation, pressure is continuously applied to the assembly, after termination of the heating current, until the anode has cooled enough to indicate no color due to heat, which is normally 1½ minutes later. The assembly is then allowed to cool further for twelve minutes before it is removed from the hydrogen bottle. Although a longer heating time may be used, the assembly gets very hot and no gain by such longer heating has been observed. It is, therefore, recommended that the heating time specified be employed, as longer heating might even unfavorably affect the joint produced.

6. The anode assembly, produced as above described, is now ready for sealing to the cathode-bulb assembly without any further treatment. The glass-anode assembly as removed from the hydrogen bottle is found extremely clean and bright, and a complete elimination of shrinkage caused by bulb deposits has resulted.

As for economy, it has been found that a saving of approximately $7.00 per tube can be realized, since the following items are eliminated:

1. Two gold solder rings .05" in diameter, normally used to solder the hood to the anode body.
2. All mechanical polishing, which was required after annealing.
3. All bulb deposits.
4. Trucking of glass assembly to other part of the factory, for annealing in a hydrogen furnace.

The foregoing method of joining copper to copper or gold-plated copper to copper, although described for a special application, is obviously applicable to other metal assemblies. For instance, a "Kovar" cup can be copper-plated, or copper plus gold plated, and welded to a copper body in accordance with a similar schedule.

Such a method, as above described, may also be applied to the joining of non-cuprous metal parts, such as stainless steel, tungsten, titanium, zirconium and almost any commercial metal, to copper, or the joining of dissimilar non-cuprous metals by first copper plating. It may be necessary in some cases to hydrogen bake the copper assembly, to give the copper a more intimate contact with the base metal.

It is possible to apply heat to the parts or assemblies by other means, such as by radio frequency or by radiations and conductive heating, such as when a tungsten filament coil which surrounds the parts is heated by means of electrical power either D. C. or A. C.

Although a preferred embodiment of our invention has been described, it will be understood that modifications may be made within the spirit and scope of the appended claims. "Kovar" is defined in the Lempert et al. Patent No. 2,279,831, dated April 14, 1942.

We claim:
1. The method of uniting copper parts comprising cleaning the surfaces which are to be joined, gold plating one of said surfaces, placing said surfaces in abutting engagement, enclosing said parts in a reducing atmosphere, and passing welding current through said parts while pressing them together.

2. In an X-ray tube, a copper anode block, a target portion projecting therefrom, a copper hood enclosing said target portion, and with a flat edge surface butt-welded to a flat surface around the base of said target portion, with a film of gold between said welded parts, and complete interlocking grain growth at the weld.

3. The method of uniting the flat portion, of a copper anode block for an X-ray tube, which surrounds the target portion of said block, to the flat edge portion of a copper hood which lies in a plane transverse to the tube axis, comprising cleaning the surfaces to be united, further treating one of said surfaces to facilitate the effecting of a strong bond with the other surface, placing said block and hood one above the other with said surfaces in abutting engagement, enclosing them in a reducing atmosphere, and passing welding current therethrough while steadily pressing them together.

References Cited in the file of this patent

UNITED STATES PATENTS

| Number | Name | Date |
|---|---|---|
| 419,032 | Coffin | Jan. 7, 1890 |
| 1,092,489 | Kesselring | Apr. 7, 1914 |
| 1,176,614 | Stanley | Mar. 21, 1916 |
| 1,181,741 | Coolidge | May 2, 1916 |
| 1,238,575 | Schluter | Aug. 28, 1917 |
| 1,292,037 | Pfanstiehl | Jan. 21, 1919 |
| 1,714,975 | Coolidge | May 28, 1929 |
| 1,715,150 | Ulrey et al. | May 28, 1929 |
| 1,733,922 | Trageser et al. | Oct. 29, 1929 |
| 1,867,028 | Phelps | July 12, 1932 |
| 1,953,813 | Matsushima | Apr. 3, 1934 |
| 2,018,380 | Pfeiffer | Oct. 12, 1935 |
| 2,046,808 | Bouwers et al. | July 7, 1936 |
| 2,079,893 | Bain et al. | May 11, 1937 |
| 2,122,994 | Southgate | July 5, 1938 |
| 2,167,275 | Gross et al. | July 25, 1939 |
| 2,205,297 | Lenz | June 18, 1940 |
| 2,293,523 | Warren | Aug. 18, 1942 |
| 2,309,566 | Atlee et al. | Jan. 26, 1943 |
| 2,315,294 | Stewart et al. | Mar. 30, 1943 |
| 2,340,500 | Zunick | Feb. 1, 1944 |
| 2,341,483 | Stephen | Feb. 8, 1944 |
| 2,379,397 | Zunick | June 26, 1945 |
| 2,407,857 | Verhoeff | Sept. 17, 1946 |
| 2,431,277 | Pressel | Nov. 18, 1947 |
| 2,482,053 | Zunick | Sept. 13, 1949 |

FOREIGN PATENTS

| Number | Country | Date |
|---|---|---|
| 224,000 | Great Britain | Nov. 3, 1924 |
| 552,416 | Great Britain | Apr. 7, 1943 |